Patented Mar. 25, 1952

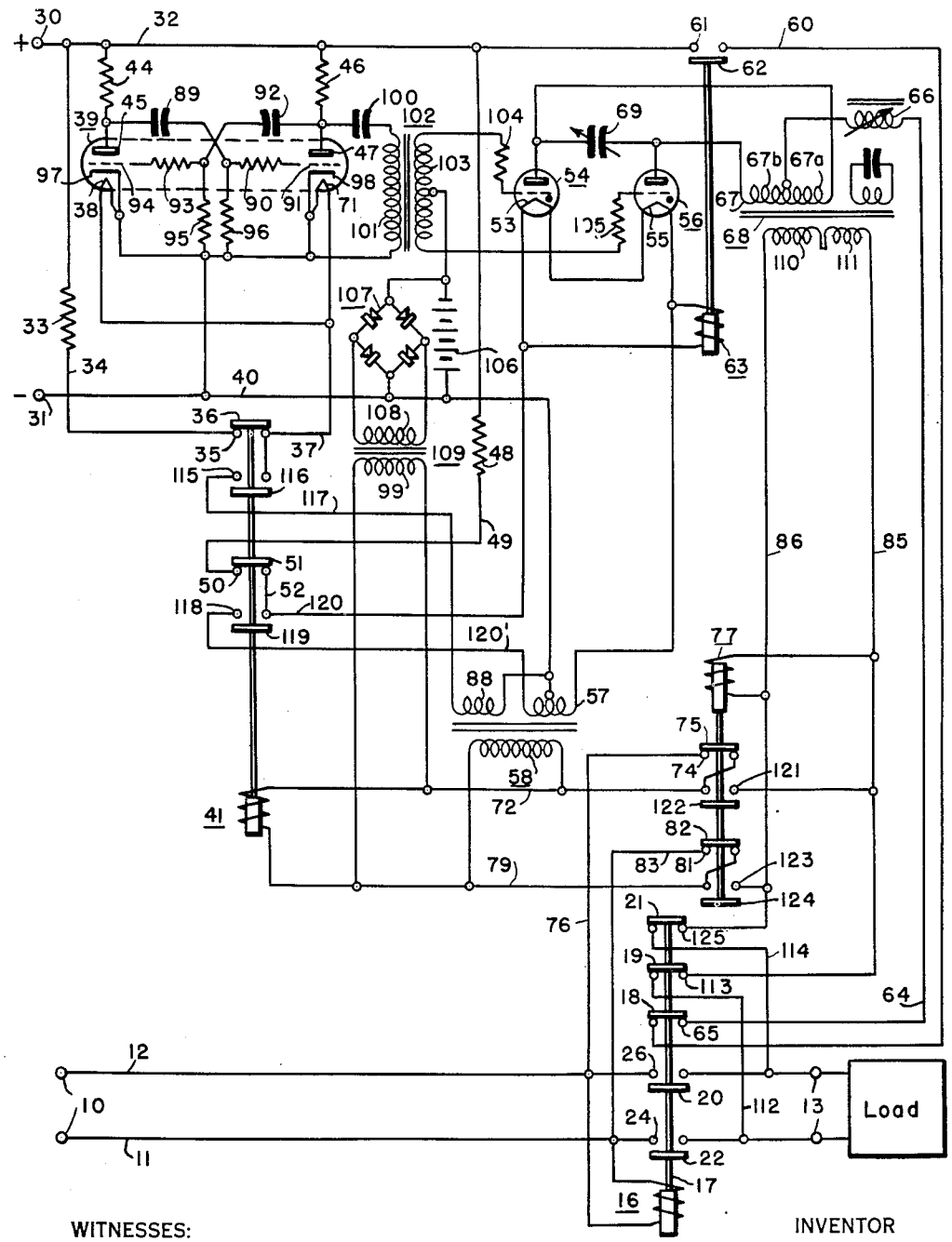

2,590,611

UNITED STATES PATENT OFFICE 2,590,611

POWER SUPPLY

Frank B. Gunter, Glen Burnie, Md., assignor to Westinghouse Electric Corporation, East Pittsburgh, Pa., a corporation of Pennsylvania Application October 29, 1949, Serial No. 124,431

8 Claims. (Cl. 171—97)

This invention relates to power supplies for providing alternating current from direct current, and relates more particularly to emergency power supplies for providing alternating current from batteries or other suitable sources of direct current, without interruption to a load, in case of failure of the usual alternating current supply.

The usual emergency power supplies for providing alternating current from a direct current source have used motor-generator sets or vibrator type supplies which have not proved satisfactory. Motor-generator sets, due to their rotating parts are subject to wear and require considerable maintenance. The times required for them to come up to speed means loss of power during what might be critical periods for many applications. Vibrator type supplies are fast starting but are essentially low power devices. If designed to handle power of 500 watts or more, a large number of contacts is required with resulting wear and maintenance.

This invention provides electronic conversion of direct current to alternating current. In one embodiment of the invention, a vacuum tube multivibrator converts direct current into pulses which are supplied to a pair of parallel-connected, gas filled vacuum tubes provided with a capacitor commutator, and which deliver alternating current to the load.

A feature of this invention is that means is provided for automatically switching in the emergency power supply and for switching out the ordinary alternating current supply in case of failure of, or reduced voltage from, the latter, and for switching out the emergency power supply and for switching in the ordinary alternating current supply when the latter is again operating normally.

Another feature of the invention is that the output voltage of the emergency power supply is maintained constant throughout a wide range of direct current, input voltages.

An object of the invention is to improve inverters for converting direct current to alternating current.

Another object of the invention is to provide an emergency power supply for converting direct current to alternating current without the use of rotating or vibrating parts.

Another object of the invention is automatically to connect an emergency power supply energized by direct current and supplying alternating current to an alternating current load, and to disconnect the ordinary alternating current supply upon failure of the latter, and to disconnect the emergency power supply from the load and to reconnect the ordinary alternating current supply when the latter is restored to normal operation.

Another object of the invention is to maintain the output voltage of an alternating current supply energized by direct current, constant over a wide range of direct current voltages.

The invention will now be described with reference to the drawing which is a circuit schematic illustrating one embodiment of the invention.

The input terminals 10 are for connection to an ordinary 60 cycle, 115 volt, alternating current source which is normally connected through the wires 11 and 12 and the output terminals 13, to the load served by the alternating current source.

The relay 16 has its energizing winding connected to the wiring 11 and 12 and is arranged so that when energized it will actuate its plunger 17 to which are attached the armatures 18, 19, 20, 21 and 22 which are insulated from each other. As illustrated by the drawing the relay 16 is deenergized as a result of the ordinary alternating current supply having failed, or its voltage having dropped below the voltage necessary to energize the relay.

The wiring 11 is open between the lower input terminal 10 and the lower output terminal 13 and has connected therein the contacts 24 which are adapted to touch the armature 22 when the relay 16 is energized, and which are spaced from the armature 22 when the relay is deenergized. The wiring 12 is also open between the upper input terminal 10 and the upper output terminal 13 and has connected therein the contacts 26 which are adapted to touch the armature 20 when the relay is energized, and which are adapted to be spaced from the armature 20 when the relay is deenergized. In the position illustrated by the drawing, the relay 16 is deenergized, and the respective lower and upper output terminals 13 are disconnected from the respective lower and upper input terminals 10 through the relay armature 22 being separated from the contacts 24, and through the relay armature 20 being separated from the contacts 26. The other armatures of the relay 16 and the contacts associated therewith will close and open other circuits as will be described later in this description.

The input terminals 30 and 31 are for connection to a 115 volt, direct current supply source, the terminal 30 being the positive terminal, and the terminal 31 being the negative terminal. The terminal 30 is connected through the wiring 32, the resistor 33, the wiring 34, the relay contacts 35, the relay armature 36 of the relay 41 when the latter is deenergized as illustrated by the drawing, and the wiring 37 to one side of the filament 38 of the dual-triode tube 39, the other side of the filament 38 being connected to the wiring 40 which is connected to the negative terminal 31.

The wiring 32 is also connected through the resistor 44 to the plate 45 of the tube 39, and through the resistor 46 to the plate 47 of the tube 39.

The wiring 32 is also connected through the resistor 48, the wiring 49, the relay contacts 50 of the relay 41, the relay armature 51 when the relay 41 is deenergized as illustrated by the drawing, and the wiring 52 and 120 to one side of the filament 53 of the gas filled vacuum tube 54. The other side of the filament 53 is connected to one side of the filament 55 of the gas filled vacuum tube 56, the other side of which is connected to one side of the secondary winding 57 of the transformer 58, the center-tap of the winding 57 being connected to the wiring 40.

The wiring 32 is also connected through the contacts 61 and the armature 62 of the relay 63 when the latter is energized, the wiring 60, the contacts 65 and the armature 18 of the relay 16 where the latter is deenergized as illustrated by the drawing, through the wiring 64 and the inductor 66 to the center-tap of the primary winding 67 of the output transformer 68.

One portion 67a of the transformer winding 67 is connected to the plate of the tube 54, and its other portion 67b is connected to the plate of the tube 56, the two plates being interconnected by the commutator capacitor 69.

The filament 71 of the dual-triode tube 39 is shunted across the filament 38 of the tube 39.

The circuit connections described in the foregoing in connection with the filaments of the tubes 39, 54 and 56 are for enabling them to be energized through voltage dropping resistors form the direct current supply when alternating current is not available. The relay 41 which completes these connections has one side of its energizing winding connected through the wiring 72, the contacts 74 and the armature 75 of the relay 77 when the latter is deenergized as illustrated by the drawing, the wiring 76, and the wiring 12 to one of the alternating current input terminals 10. The other side of the energizing winding of the relay 41 is connected through the wiring 79, the contacts 81 and the armature 82 of the relay 77 when the latter is deenergized as illustrated by the drawing, the wiring 83 and the wiring 11 to the other of the alternating current input terminals 10.

The relay 16 has its energizing winding connected to the alternating current input terminals 10, and when it is deenergized as illustrated by the drawing, it acts to open the circuit between the input terminals 10 and the output terminals 13 and to close the circuit between the output terminals 13 and the inverter output transformer 68.

The relay 77 has its energizing winding connected to the wires 85 and 86 which provide alternating current from the inverter as will be described later, and when it is deenergized as illustrated by the drawing, it acts to close a circuit to be described, which will energize the relay 41 from the alternating current output of the inverter.

When deenergized through the lack of alternating current supply from either the ordinary alternating current source, or the inverter, the relay 41 acts to supply direct current through the contacts 50 to the filaments of the tubes 39, 54 and 56 whereby they are energized at all times.

Due to the losses through the voltage dropping resistors 33 and 48, it is desirable to energize the filaments of the tubes from alternating current when it is available, and relay 16 will act, as will be described later, to supply alternating current through the step-down transformer 58 from the input terminals 10 when it is available there, or from the output of the inverter when alternating current at the input terminals 10 is not available, and when the inverter is operating properly.

The electrodes of the tube 39 are connected in a conventional multi-vibrator circuit, the plate 45 of one triode section being connected through the capacitor 89 and the resistor 90 to the grid 91 of the other triode section, the plate 47 of the other triode section being connected through the capacitor 92 and the resistor 93 to the grid 94 of the said one triode section.

The grid resistors 95 and 96 connect the grids 94 and 91 to their associated cathodes 97 and 98 respectively, which are interconnected.

The plate 47 of the tube 39 is connected through the coupling capacitor 100 to one side of the primary winding 101 of the transformer 102, the other side of which is connected to the cathodes of the tube 39.

The secondary winding 103 of the transformer 102 is connected at one side through the resistor 104 to the control grid of the tube 54, and is connected at its other side through the resistor 105 to the control grid of the tube 56. The center-point of the transformer winding 103 is connected to the negative terminal of the bias battery 106, the positive terminal of which is connected to the wire 40 and to the centertap of the filament energizing winding 57 of the transformer 58.

The bias battery 106 is connected to the bridge rectifier 107 which is energized by the secondary winding 108 of the transformer 109, the primary winding 99 of which is shunted across the energizing winding of the relay 41, whereby when alternating current is available the bias battery will be charged thus ensuring constant bias voltage.

The tubes 54 and 56 are gas filled tubes which function as grid controlled rectifiers.

The multi-vibrator tube 39 provides a square wave output voltage which is supplied through the coupling capacitor 100 to the transformer 102 which differentiates its square wave input voltage so that its secondary winding 103 delivers short voltage pulses for triggering the inverter tubes 54 and 56. The values of the resistors 90, 93, 95 and 96, and of the capacitors 89 and 92 are selected to provide an operating frequency for the multi-vibrator of 60 cycles per second.

When the tube 54 is triggered by a positive pulse applied to its grid from the transformer secondary 103 of the transformer 102, the tube will fire and current will flow in its plate circuit which may be traced from the positive terminal 30 of the direct current source through wiring 32, contacts 61 and armature 62 of relay 63, wiring 60, contacts 65 and armature 18 of relay 16, wiring 64, inductor 66 to center-tap of primary winding 67 of transformer 68, through one portion 67a of primary winding 67 to the plate of tube 54. The cathode circuit of tube 54 extends from its cathode 53, through wiring 120, contacts 118 and armature 119, wiring 120', a portion of the secondary 57 of transformer 58, the wiring 40, to the negative terminal 31 of the direct current source.

At the initial instant that the tube 54 conducts, the capacitor 69 is charged through the other portion 67b of the primary winding 67. After the capacitor 69 becomes charged, the portion 67a of the primary winding 67 carrying the plate current to the plate of tube 54 then induces a voltage in the secondary windings 110 and 111 which will appear between the output wires 85 and 86 connected thereto.

At the start of the next half-cycle, the grid of the tube 56 will be supplied with a positive pulse which will trigger it, causing it to fire and current to flow in its plate circuit. Although the grid of the tube 54 will be negative at this time this will have no effect upon the flow of plate current through tube 54, since once a gas filled tube has fired its grid cannot stop the flow of plate current. Current in the plate circuit of the tube 56 will flow in the portion 67b of the primary winding 67 of the output transformer 68. The voltage drop between the cathode and the plate of the tube 56 is very low during the time it conducts so that the side of the capacitor 69 connected to the plate of tube 56 is virtually connected to the negative side of the plate voltage supply which in this case is the wire 40 connected to the negative input terminal 31. Since the capacitor 69 was charged by the firing of the tube 54 with its terminal connected to the plate of the tube 54 negative with respect to its other terminal, the firing of the tube 56 by a positive pulse applied to its grid will result in the full negative charge of the capacitor being applied between the plate and cathode of the tube 54 allowing its grid to again take control.

This action repeats itself during the cycling, the action of the tubes 54 and 56 being interchanged at the beginning of successive half cycles. This results in the secondary windings 110 and 111 of the output transformer delivering 60 cycle, 115 volt, alternating current between the output wires 85 and 86.

The capacity of the capacitor 69 and the inductance of the inductor 66 may be adjusted to change the wave shape of the output of the inverter to suit the load requirements.

When the relay 16 is deenergized as illustrated by the drawing, it not only opens the wiring 11 and 12 connecting the ordinary alternating current supply to the output terminals 13, and closes the circuit including the wiring 64 and the relay armature 18, connecting the center-tap of the primary winding 67 of the output transformer 68 to the plate voltage supply wiring 60 which is connected to the wiring 32 connected to the positive terminal 30 of the direct current source when the relay 63 is energized as will be described in the description to follow, but it closes circuits connecting the output of the transformer 68 to the output terminals 13 which include the wiring 114 connected to the wire 86, through the relay contacts 111, and the relay armature 21, and include the wiring 112 connected to the wire 85, through the relay contacts 113 and the relay armature 19.

When the relay 41 is deenergized as illustrated by the drawing as a result of the failure of the alternating current supplies, in addition to closing circuits connecting the filaments of the tubes 39, 54 and 56 to the direct current supply source, it also opens circuits as will now be described for disconnecting the filaments from the secondary windings of the filament transformer 58. The filaments of the tube 39 are disconnected from their associated secondary winding 88 of the transformer 58 by the separation of the relay contacts 115 connected to the wiring 37 and 117, from the relay armature 116. The filaments of the tubes 54 and 56 are disconnected from their associated secondary winding 57 of the transformer 58 by the separation of the relay contacts 118 connected to the wires 120, from the relay armature 119.

The relay 77 when deenergized as illustrated by the drawing as a result of the absence of alternating current from the output transformer 68, in addition to closing the described circuits including the relay contacts 74 and 81, for connecting the primary winding of the filament transformer 58 to the ordinary alternating current supply wiring 76 and 83, acts to open the circuit including the relay contacts 121 and the relay armature 122, and including the relay contacts 123 and the relay armature 124, connecting the primary of the filament transformer to the output wiring 85 and 86 of the output transformer 68.

The relay 63 which would be energized when alternating current from either the ordinary source or the inverter is available, is deenergized when alternating current from neither source is available, and when deenergized as illustrated by the drawing, its contacts 61 are spaced from its armature 62 thereby opening the circuit supplying direct current through the wiring 32 and 60, the inductor 66 and the primary 67 of the output transformer 68, to the plates of the rectifier tubes 54 and 56.

Summarizing the actions of the automatic controls, when alternating current from the ordinary source is available, the relay 16 will be energized, and its armatures will close circuits connecting the ordinary alternating current source to the output terminals 13, and will partially close a circuit through contacts 61 of relay 63 connecting the primary of the output transformer 68 to the positive terminal of the direct current supply. At the same time it will open circuits connecting the output of the inverter to the output terminals 13.

The relay 77 will be deenergized at this time and will close the circuit connecting the primary of the filament transformer 58 to the wiring of the ordinary alternating current source. At the same time it will open the circuit connecting the primary of the filament transformer to the output of the inverter.

The relay 41 will be energized at this time and will close the circuit connecting the filaments of the tubes 39, 54 and 56 to the filament transformer 58 and will open the circuit connecting the filaments of the tubes 39, 54 and 56 to the direct current source.

The relay 63 will be energized at this time and will complete the circuit connecting the primary winding 67 of the output transformer 68 to the direct current source.

When the ordinary alternating current source fails or its voltage drops below that necessary to energize the relay 16, the latter becomes deenergized and acts as illustrated by the drawing, to open the connections between the input terminals 10 and the output terminals 13, and to close the circuit connecting the output terminals 13 to the wiring 85 and 86 from the output transformer 68.

Likewise the relay 41 becomes deenergized. During the transition period from ordinary alternating current source to the inverter alternating current source, and to maintain the direct current source to the plates of the inverter tubes 54 and 56, the contacts 59 are bridged by the armature 51 of the relay 41 which energizes a circuit from wiring 32 through resistor 48, wiring 49, contacts 50, armature 51 of relay 41, wiring 52 and 128 through the cathodes 53 and 55 of the tubes 54 and 56, respectively, through the secondary 57 of transformer 58 to wiring 40 of the direct current source. The energizing winding of the relay 63 is shunted across the filaments 53 and 55 and, therefore, if the filaments are energized, the plate source for the tubes 54 and 56 is maintained through contacts 61 and armature 62 of the relay 63.

The filaments of the multi-vibrator tube 39 are also maintained energized during the transition period through the contacts 35 and armature 36 of the relay 41.

The relay 77 will then be energized by the supply of alternating current from the inverter, and will act to open the circuit connecting the filament transformer 58 to the wiring of the ordinary alternating current supply, and to close the circuit connecting the filament transformer to the output of the inverter.

The inverter will then continue in operation until power is available from the ordinary alternating current source, or until it fails for some reason. If the inverter does fail while power is not available from the ordinary alternating current supply, the relay 41 will be deenergized and will act to disconnect the filaments of the vacuum tubes from the filament transformer 58, and to connect them to the direct current supply whereby they will be energized at all times for stand-by service.

The output transformer 68 is a voltage regulating transformer, and utilizes a combination of a resonant electrical circuit and a high leakage reactance magnetic circuit for compensating for varying direct current voltages from the direct current source. The transformer 68 is an integral part of the plate circuits of the inverter tubes 54 and 56, and it compensates for variations in the direct current voltage input to the tubes 54 and 56.

From the foregoing description taken in connection with the accompanying drawing it is seen that the present invention provides an improved inverter system for providing alternating current from batteries or other suitable sources of direct current.

I claim as my invention:

1. A power supply system comprising alternating current input connections, alternating current output connections, connections between said input and output connections, direct current input connections, an electronic inverter for converting direct current supplied by said direct current connections into alternating current, said inverter including gas filled inverter tubes and a multi-vibrator for triggering said tubes, and means actuated when no current or current of reduced magnitude flows through said alternating current input connections, for disconnecting said connections between said alternating current input and output connections, for energizing said inverter from said direct current connections, and for connecting said inverter to said output connections.

2. A power supply system comprising alternating current output connections, direct current input connections, a parallel inverter including a pair of gas filled, electron tubes having control grids and anodes, an output transformer having a primary winding connected to said anodes and to said input connections, and having a secondary winding connected to said output connections, a commutator capacitor connected to said anodes, an input transformer having a secondary winding connected to said grids and having a primary winding, and an electronic multi-vibrator having its input connected to said direct current connections and having its output connected to the primary winding of said input transformer.

3. A power supply system comprising alternating current output connections, direct current input connections, a pair of electron tubes having cathodes, control grids and anodes connected in an electronic multi-vibrator circuit to said input connections, a pair of gas filled electron tubes having control grids and anodes, a transformer having a primary winding connected in said circuit and having a secondary winding connected to said grids of said gas filled tubes, an output transformer having a primary winding connected to said anodes of said gas filled tubes and having a secondary winding connected to said output connections, and a commutator capacitor connected to said anodes of said gas filled tubes.

4. A power supply system comprising alternating current input connections, alternating current output connections, connections between said input and output connections, direct current input connections, a pair of electron tubes having cathodes, control grids and anodes connected in a multi-vibrator circuit to said direct current connections, a pair of gas filled electron tubes having control grids, and anodes, a transformer having a primary winding connected in said circuit and having a secondary winding connected to said grids of said gas filled tubes, an output transformer having a primary winding connected to said anodes of said gas filled tubes and having a secondary winding, a commutator capacitor connected to said anodes of said gas filled tubes, connections between said secondary winding of said output transformer and said output connections, and means actuated when no current or current of reduced potential flows in said alternating current input connections for opening said connections between said alternating current input and output connections, for closing said connections between said secondary winding of said output transformer and said output connections, and for connecting said primary winding of said output transformer to said direct current connections.

5. The invention claimed in claim 4 in which the tubes have filaments, and means is provided for heating said filaments with current from said alternating current input connections when supplied with current of normal potential, and for heating said filaments with current from the secondary winding of the output transformers when no current or current of reduced potential is supplied to said alternating current input connections.

6. The invention claimed in claim 5 in which means is provided for heating said filaments from the direct current input connections when no current or current of reduced potential is supplied by said alternating current input connections or by the secondary of the output transformer.

7. In a power supply system comprising an electronic inverter for converting direct current into alternating current, the combination of a multi-vibrator adapted to be connected to a source of direct current, electric discharge tubes in the output circuit of said multi-vibrator, a commutator circuit connected to said tubes, and an output voltage regulating transformer connected across said commutator circuit and adapted to deliver alternating current to a load.

8. A power supply system comprising alternating current input connections, alternating current output connections, connections between said input and output connections, direct current input connections, a parallel inverter including a pair of gas filled electron tubes having control grids and anodes, an output transformer having a primary winding connected to said anodes, and having a secondary winding, connections between said secondary winding and said output connections, a commutator capacitor connected to said anodes, a differentiating transformer having a secondary winding connected to said grids and having a primary winding, a multivibrator connected to said direct current connections and to the primary winding of said differentiating transformer, and means actuated when no current or current of reduced voltage flows in said alternating current input connections for opening said connections between the alternating input and output connections, for connecting said primary winding of said output transformer to said direct current connections, and for closing said connections between said secondary winding of said output transformer.

FRANK B. GUNTER.

REFERENCES CITED

The following references are of record in the file of this patent:

UNITED STATES PATENTS

| Number | Name | Date |
|---|---|---|
| 2,263,320 | Trucksess | Nov. 18, 1941 |